(12) United States Patent
Maul

(10) Patent No.: US 6,339,805 B1
(45) Date of Patent: Jan. 15, 2002

(54) CONNECTING PROCESS AND BUS INTERFACE FOR CONNECTING A SUBASSEMBLY OF A PROGRAMMABLE CONTROLLER TO A BUS

(75) Inventor: Jürgen Maul, Sulzbach-Rosenberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/155,026

(22) PCT Filed: Mar. 6, 1997

(86) PCT No.: PCT/DE97/00435
§ 371 Date: Nov. 30, 1998
§ 102(e) Date: Nov. 30, 1998

(87) PCT Pub. No.: WO97/35261
PCT Pub. Date: Sep. 25, 1997

(30) Foreign Application Priority Data

Mar. 18, 1996 (DE) .......................... 196 10 557

(51) Int. Cl.⁷ ............................................. G06F 13/00
(52) U.S. Cl. ..................... 710/102; 714/721; 340/657
(58) Field of Search ................................. 710/100, 101, 710/102, 103, 104, 126, 128, 129, 131, 107, 15, 62; 714/719, 721, 724, 725, 735; 340/505, 657, 660–666

(56) References Cited

U.S. PATENT DOCUMENTS

| 4,245,270 A | 1/1981 | Busby ........................ 361/58 |
| 4,510,553 A | * 4/1985 | Faultersack .................. 361/413 |
| 5,099,391 A | * 3/1992 | Maggelet et al. ........... 361/395 |
| 5,157,590 A | * 10/1992 | Barthel et al. ............... 361/427 |
| 5,432,907 A | * 7/1995 | Picazo, Jr. et al. .......... 709/200 |
| 5,512,936 A | * 4/1996 | Burton et al. .................. 348/11 |
| 6,049,221 A | * 4/2000 | Ishibashi et al. |

FOREIGN PATENT DOCUMENTS

| EP | 0 402 055 | 12/1990 |
| EP | 0 490 010 | 6/1992 |
| EP | 0 490 010 A1 | * 6/1992 |
| EP | 0 632 393 | 1/1995 |
| EP | 0 661 643 | 7/1995 |
| WO | WO 93/15459 | 8/1993 |

\* cited by examiner

*Primary Examiner*—Ario Etienne
(74) *Attorney, Agent, or Firm*—Staas & Halsey LLP

(57) ABSTRACT

In order, in the case of a programmable logic controller having a modular structure, to be able to insert and withdraw assemblies even in the course of operation, without disturbing the data traffic taking place via the bus of the programmable logic controller, provision is made for arranging an evaluation circuit in a bus access circuit. The evaluation circuit controls a variable resistor, which is arranged in one of the supply lines for the assemble, to have a low resistance if the assembly is connected to the bus and to have a high resistance again if a potential present at a test input of the evaluation circuit lies outside a predetermined value range after a run-up time has elapsed.

12 Claims, 4 Drawing Sheets

CONNECTING PROCESS AND BUS INTERFACE FOR CONNECTING A SUBASSEMBLY OF A PROGRAMMABLE CONTROLLER TO A BUS

FIELD OF THE INVENTION

The present invention relates to a connection method for connecting an assembly of a programmable logic controller to a bus.

BACKGROUND INFORMATION

The provision of leading contacts in an assembly, by means of which contacts the power supply contacts can make contact with a mounting rack before the other contacts of the assembly, is described in European Application No. 0 388 753. In this European Application, a resistor is arranged in the supply lines on the assembly, which resistor can be bridged by a switch. The switch is actuated only when a buffer capacitor arranged on the assembly is sufficiently charged.

A similar circuit arrangement is described in German Patent Number 39 42 480. Leading supply contacts and an electronic switch are present in this German Patent, too, the electronic switch coupling one of the supply lines directly to the load and the switch being closed only when a buffer capacitor has been sufficiently charged.

The abovementioned circuit solves the problem of impermissible feedback to the bus to which the assemblies are connected during insertion when the assemblies are functioning properly. If, however, the actual useful circuit is defective, in particular has a short circuit, it is possible that the power supply of an entire system collapses as a result of the insertion of the additional (defective) assembly.

A conventional connection method is described in International Patent Publication No. WO 93/15459. Waiting for a run-up time to elapse for the bus access circuit is described in a comparable technical context in European Patent Application No. 0 402 055.

SUMMARY OF THE INVENTION

The object of the present invention is to provide total system including a plurality of assemblies which is capable of running even when a defective assembly is connected to the total system during operation.

The object is achieved using the method and bus access circuit according to the present invention, with the following steps.

when the assembly is connected to the bus, the variable resistor is controlled to have a low resistance, after the variable resistor has been controlled to have a low resistance there is a wait until a run-up time has elapsed, and the variable resistor is controlled to have a high resistance again if a potential present at a test input of the evaluation circuit lies outside a predetermined value range after the run-up time has elapsed and is controlled to have a low resistance only after a connection time has elapsed.

In the case of the bus access circuit of the generic type, the problem is solved by the fact that the evaluation circuit has a test input by means of which it is possible to acquire the potential present at the assembly, the evaluation circuit is designed in such a way that it controls the variable resistor to have a high resistance when an assembly is not connected the bus, controls the variable resistor to have a low resistance when the assembly is connected to the bus, waits for a run-up time to elapse after the variable resistor has been controlled to have a low resistance, controls the variable resistor to have a high resistance again if the potential present at the test input lies outside a predetermined value range after the run-up time has elapsed controls the variable resistor to have a low resistance only after a connection time has elapsed.

The fact that the resistor is controlled to have a low resistance with the evaluation circuit only after a connection time has elapsed ensures that the assembly is reliably connected to the bus only when all the contacts of the assembly are connected to the corresponding bus contacts. Impermissible disturbances on the bus are thereby avoided.

The effect achieved by another embodiment according to the present invention is that the assembly is coupled smoothly to the bus. Feedback to the bus during the coupling of the assembly is thereby reduced even further.

The effect achieved by another embodiment according to the present invention is that when a defective assembly is connected, the signals transmitted via the bus are affected as little as possible.

The effect achieved by another embodiment according to the present invention is that the assembly is connected to the bus in terms of data technology only when it can in fact communicate via the bus. Disturbances to the bus traffic are thereby avoided.

DETAILED DESCRIPTION

Figure 1:
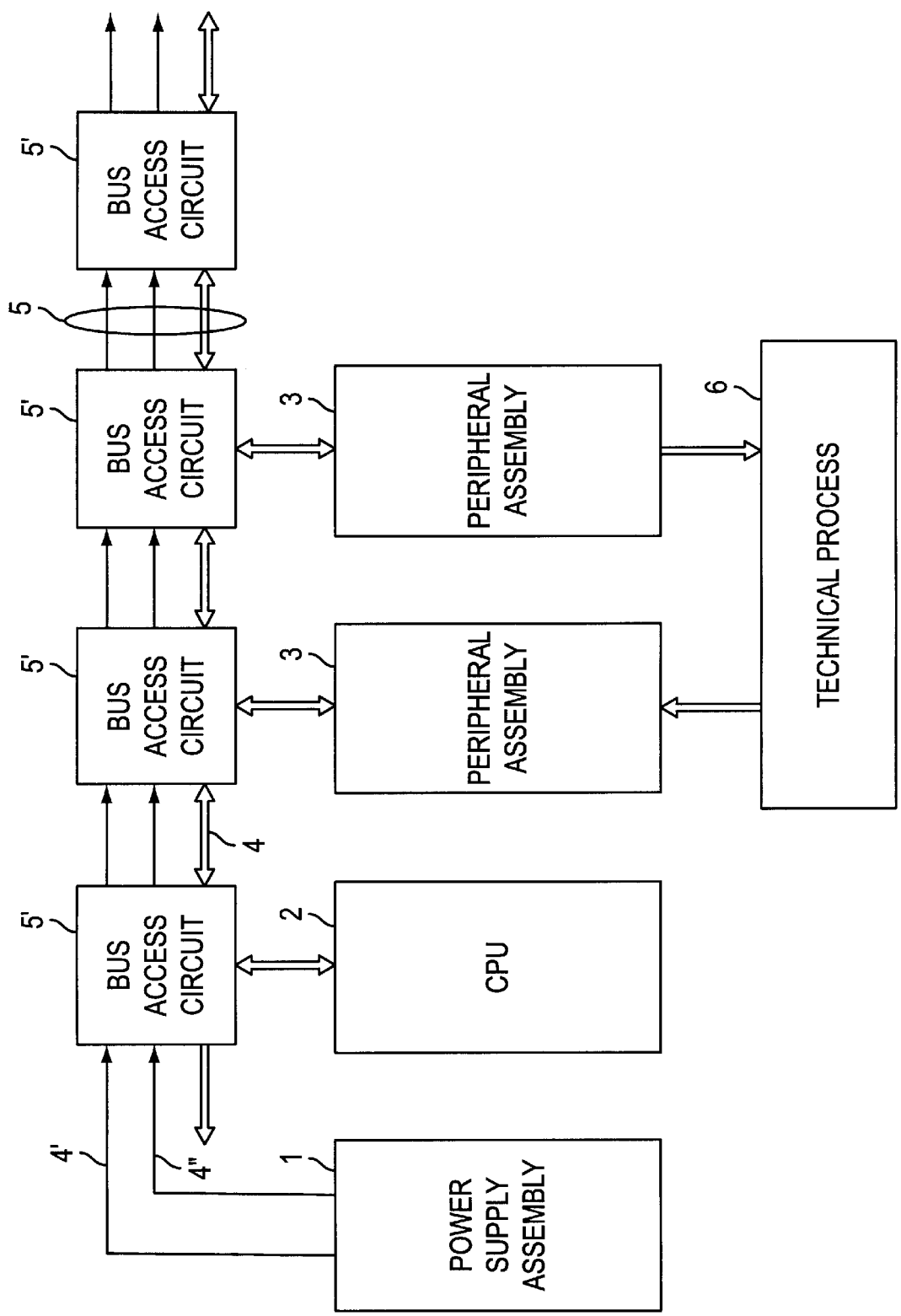
FIG. 1 shows a modular programmable logic controller.

According to FIG. 1, a modular programmable logic controller includes a power supply assembly 1, a central processing unit 2 and peripheral assemblies 3. The peripheral assemblies 3 may be, for example, digital or analog input and/or output assemblies. Furthermore, the peripheral assemblies 3 may also be hybrid input/output assemblies or intelligent functional modules. The central processing unit 2 controls and monitors a technical process 6, for example a chemical installation or a hydraulic press, via the peripheral assemblies 3.

The central processing unit 2 and the assemblies 3 are for this purpose connected to one another in terms of data technology via the control bus 4. The central processing unit 2 and the peripheral assemblies 3 are furthermore supplied with electrical energy via the supply lines 4', 4". A common earth connection is established via the supply line 4"; supply line 4' usually carries a potential of +5 volts. The control bus 4 and supply lines 4', 4" together form the backplane bus 5 of the programmable logic controller. As show in FIG. 1, the backplane bus 5 is divided into individual bus access circuits 5', which are respectively assigned to an assembly 2, 3.

Only two peripheral assemblies 3 are illustrated in the example above. Of course, the programmable logic controller could alternatively have more assemblies, for example 5, 8, 10 . . . Furthermore, the control bus 4 can be designed as required. Therefore, the control bus 4 may be, for example, a serial bus which, in the minimum case, includes just one clock line and one data line. However, the control bus 4 could also be a parallel bus including a multiplicity of address, data and control lines. The lines of the control bus 4 form the signal lines of the present invention.

Figure 2:
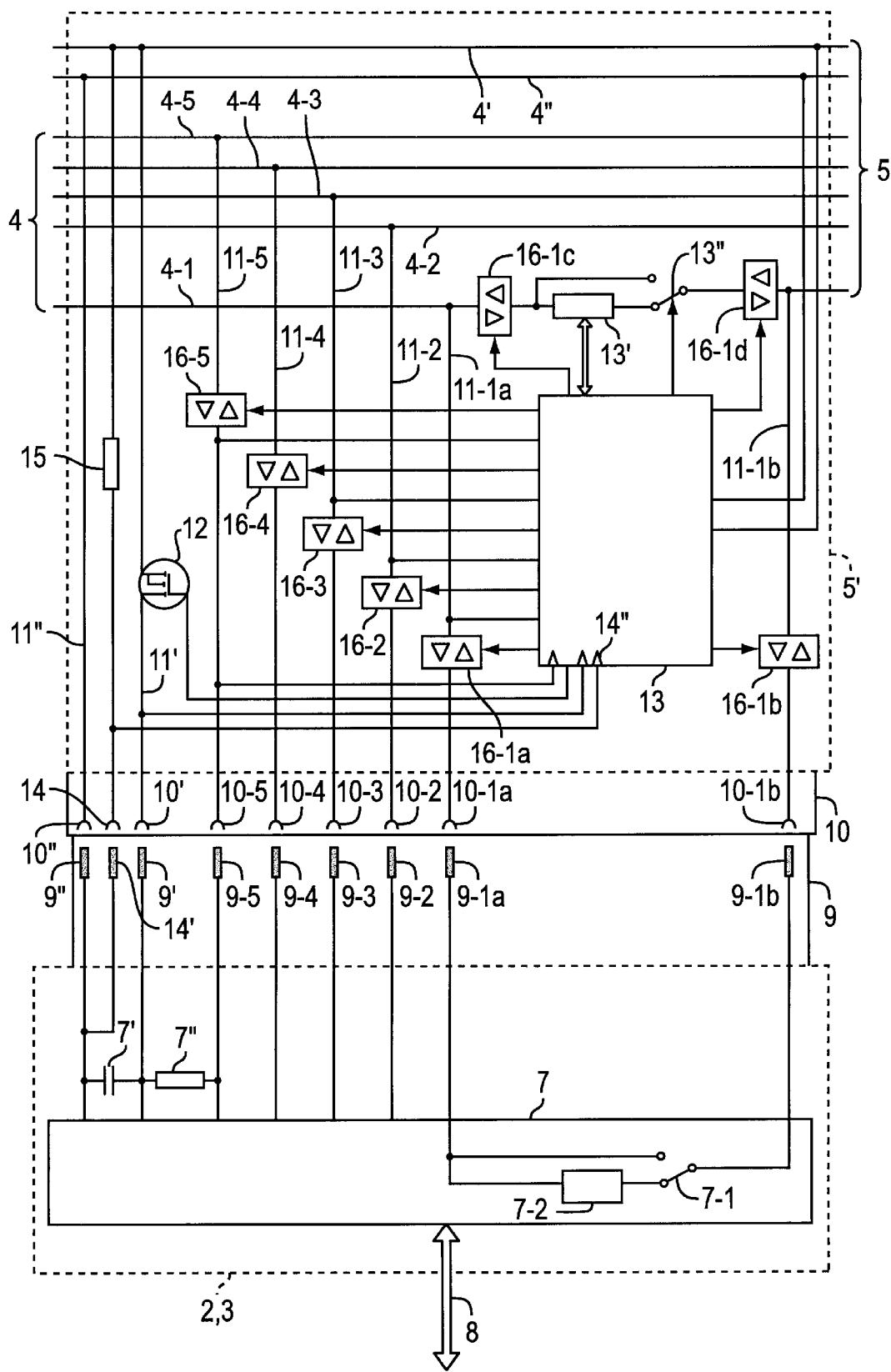
FIG. 2 shows a connection of an assembly of the programmable logic controller to a bus.

FIG. 2 shows such a bus access circuit. As show.

FIG. 2, the control bus 4 is a serial bus in the present case. It has five lines 4-1 to 4-5. The line 4-1 is a bidirectional data line. The line 4-2 is the clock line via which the clock signal which is common to all the assemblies 2, 3 is transmitted. The control lines 4-3 and 4-4 are used to indicate whether a data transmission or an instruction transmission is instantaneously taking place. Via the acknowledgement line 4-5, the assemblies 3 can report to the central processing unit 2 that they have transmitted or received the transmitted data properly. The lines 4-2 to 4-5 are operated unidirectionally.

In the event of an instruction transmission, the connected assemblies 3 bridge the data line 4-1 by means of a switch 7-1 and couple a shift register 7-2 to the data line 4-1. In the event of a data transmission, the assemblies 3 evaluate the instruction transmitted last and either loop the shift register 7-2 into the data line 4-1 or bridge the data line 4-1 by means of the switch 7-1.

As is evident from FIG. 2, the assembly 2, 3 connected to the bus 5 has an internal circuit 7. In the case of a peripheral assembly 3, the internal circuit 7 is furthermore connected to the technical process 6 via the process lines 8. In each case, however, the assembly is inserted via the plug-in connection 9 into the plug-in location 10 of the bus access circuit 5' and thus connected to the bus 5. The assembly 2, 3 is coupled to the bus 5 in terms of data technology via the data contacts 9-1*a*, 9-1*b*, 10-1*a* and 10-1*b*, the clock contacts 9-2 and 10-2, the control contacts 9-3, 10-3 and 9-4, 10-4 and the acknowledgement contacts 9-5, 10-5.

The power supply of the assembly 2, 3, on the other hand, is effected via the supply contacts 9', 9" and 10', 10". A MOSFET 12 is arranged in the connection line 11' between the supply line 4' and the supply contact 10'. The volume resistance of the MOSFET 12 is, as is known, variable and adjustable within wide limits. The MOSFET 12 therefore represents the variable resistor of the present invention. The MOSFET 12 is controlled to have a high resistance or low resistance by the evaluation circuit 13, which is likewise connected to the supply lines 4', 4", by applying a corresponding control signal to the control input of the MOSFET 12.

Furthermore, the plug-in location 10 has a test contact 14, which is connected directly to the test input 14" of the evaluation circuit 13 and via the pull-up resistor 15 to the supply line 4'. No resistor, neither fixed nor variable, is arranged in the connection line 11", on the other hand.

The potential present at the supply contact 10', the potential present at the test contact 14 and the potential present at the acknowledgement contact 10-5 are essentially fed as input signals to the evaluation circuit 13. By evaluating these input signals, the evaluation circuit 13 controls the (bidirectional) inhibitable drivers 16-1*a* to 16-1*d* as well as the (likewise bidirectional) inhibitable drivers 16-2 to 16-5 which are arranged in the signal connection lines 11-1*a*, 11-1*b* and 11-2 to 11-5. The inhibitable drivers 16-x may be tristate drivers, for example. However, other configurations are also conceivable.

The driving details will be explained below in connection with FIGS. 2, 3A and 3B.

Before the assembly 2, 3 is inserted into the plug-in location 10, the bus access circuit 5' is in the initialization state. During initialization, according to block 17 a flag M is set to 0. The meaning of this flag M will be explained in more detail below in connection with block 33. Then, according to block 18, the signal contacts 10-1*a*, 10-1*b* and 10-2 to 10-5 are decoupled from the control bus 4 by inhibiting the drivers 16-1*a*, 16-1*b* and 16-2 to 16-5, and the evaluation circuit 13 is coupled to the data line 4-1 by activating the drivers 16-1*c* and 16-1*d*.

Finally, according to block 19, the MOSFET 12 is controlled to have a high resistance by the evaluation circuit 13.

A check is then made in block 20 to see whether an assembly 2, 3 has been inserted into the plug-in location 10. This is done by evaluating the potential present at the test contact 14. If this potential corresponds to the potential of the supply line 4, no assembly 2, 3 has been inserted into the plug-in location 10. If, on the other hand, an assembly 2, 3 has been inserted into the plug-in location 10, the test contact 14 is connected via the mating contact 14' directly to the supply line 4", with the result that the evaluation circuit 13 can detect the change in potential.

If no assembly 2, 3 has been inserted into the plug-in location 10 (right-hand branch), the flag M is set to 0 in block 21 and the interrogation in accordance with block 20 is carried out anew. If, on the other hand, an assembly 2, 3 has been inserted, an interrogation is made in block 22 to see whether the flag M has the value 0. If this is not the case (right-hand branch), block 20 is carried out again. If, on the other hand, the flag M does have the value 0, the assembly 2, 3 has been newly inserted. In this case, block 23 is-carried out, in accordance with which there is a wait until a connection time T1 has elapsed. Afterwards, block 24 is carried out, in accordance with which an interrogation is made to see whether the assembly 2, 3 is still inserted in the plug-in location 10. This interrogation, too, is effected by evaluating the potential present at the test contact 14. If the assembly 2, 3 is no longer inserted in the plug-in location 10 (right-hand branch), the further coupling of the assembly 2, 3 to the backplane bus 5 is terminated and a return is made to block 20. Otherwise (lower branch), in accordance with block 25 the evaluation circuit 13 controls the MOSFET 12 from a high resistance to a low resistance during a starting time T2. Because the MOSFET 12 is controlled to have a low resistance during the starting time T2 rather than abruptly, the assembly 2, 3 is coupled smoothly to the power supply of the backplane bus 5.

In accordance with block 26, there is then a wait until a run-time T3 has elapsed. During this time, for example, the buffer-capacitor 7' of the assembly 2, 3 is charged. After the run-up time T3 has elapsed, a check is made in accordance with block 27 to see whether the assembly 2, 3 is being properly supplied with power. This is done by evaluating the potential present at the supply contact 10'. If the potential present at the supply contact 10' corresponds approximately to the potential of the supply line 4', for example deviates by a maximum of 0.5 volt from its potential, this is assessed as proper coupling of the power supply to the assembly 2, 3. In this case, the sequence continues with block 28. Otherwise, block 33 is carried out, in accordance with which the flag M is set to the value 1, and the sequence continues with block 19.

The consequence of setting the flag M in block 33 is that blocks 20 and 22 are now continually executed until the assembly 2, 3 is separated from the plug-in location 10. This prevents the evaluation circuit 13 from repeatedly alternately controlling the MOSFET 12 first to have a low resistance and then to have a high resistance-again.

If, on the other hand, the potential of the supply contact 10' lies within the permissible range, in accordance with block 28 the inhibitable drivers 16-2 to 16-5 are permanently activated. Furthermore, the inhibitable driver 16-1*a* is activated in the event of data transmissions from the central processing unit 2 to one of the peripheral assemblies 3. The inhibitable driver 16-1*b* is activated in the event of data transmissions from one of the peripheral assemblies 3 to the central processing unit 2. As a result, the assembly 2, 3 can monitor the data traffic taking place via the control bus 4, but cannot itself actively transmit signals signals via the control bus 4. The inhibitable drivers 16-1*c* and 16-1*d* are at this stage permanently activated. The evaluation circuit 13 knows which data transmission is currently being carried out, on account of the bus traffic monitored by the control lines 4-3 and 4-4 and the data line 4-1.

After the drivers 16-x have been activated, in accordance with block 29 there is a wait until an acceptance time T4 has elapsed. As a result, the assembly 2, 3 has an opportunity to initialize itself. During the course of the acceptance waiting time T4, the signal present at the acknowledgement contact 10-5 is evaluated by the evaluation circuit 13. The acknowledgement contact 10-5 is, as is evident from FIG. 2, connected to the supply line 4' via the pull-up resistor 7". If, during the monitoring mode, the assembly 2, 3 understands the data traffic taking place via the control bus 4 and interprets it as being meaningful, the assembly 2, 3 puts the acknowledgement contact 9-5 and hence, of course, also the acknowledgement contact 10-5 at the potential of the supply line 4" by means of suitable internal interconnection. This is monitored in the evaluation circuit 13.

If the evaluation circuit 13 has not received the acceptance signal after the acceptance waiting time T4 has elapsed, in accordance with block 30 there is a return to block 18. Otherwise, in accordance with block 31 the evaluation circuit 13 checks the data stream transmitted via the data line 4-1. If the evaluation circuit 13 recognises, on account of the instruction read into the register 13', that the programmable logic controller is performing a so-called identification run, that is to say that the central processing unit 2 is attempting to determine which peripheral assemblies 3 are connected to it, in accordance with block 32, the evaluation circuit 13 permanently activates the inhibitable drivers 16-1*a* and 16-1*b* and permanently inhibits the inhibitable drivers 16-1*c* and 16-1*d*. As a result, the evaluation circuit 13 is now decoupled from the data line 4-1, and the assembly 2, 3 is coupled to the control bus 4. The assembly 3 is therefore now able to access the control bus 4 both in a reading manner and in a writing manner.

Figure 3A:
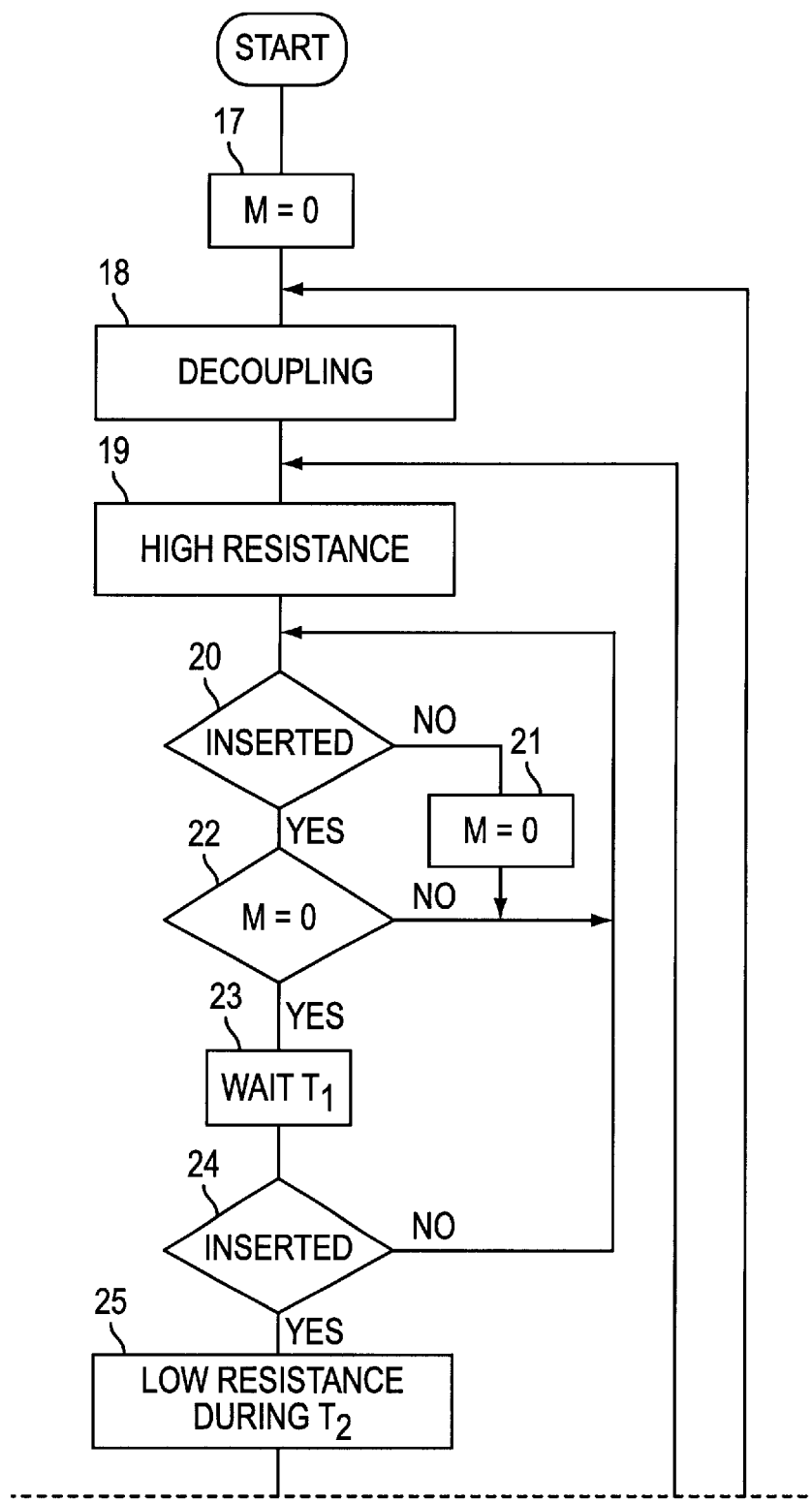
FIG. 3A shows a first portion of a sequence for coupling the assembly to the bus.
Figure 3B:
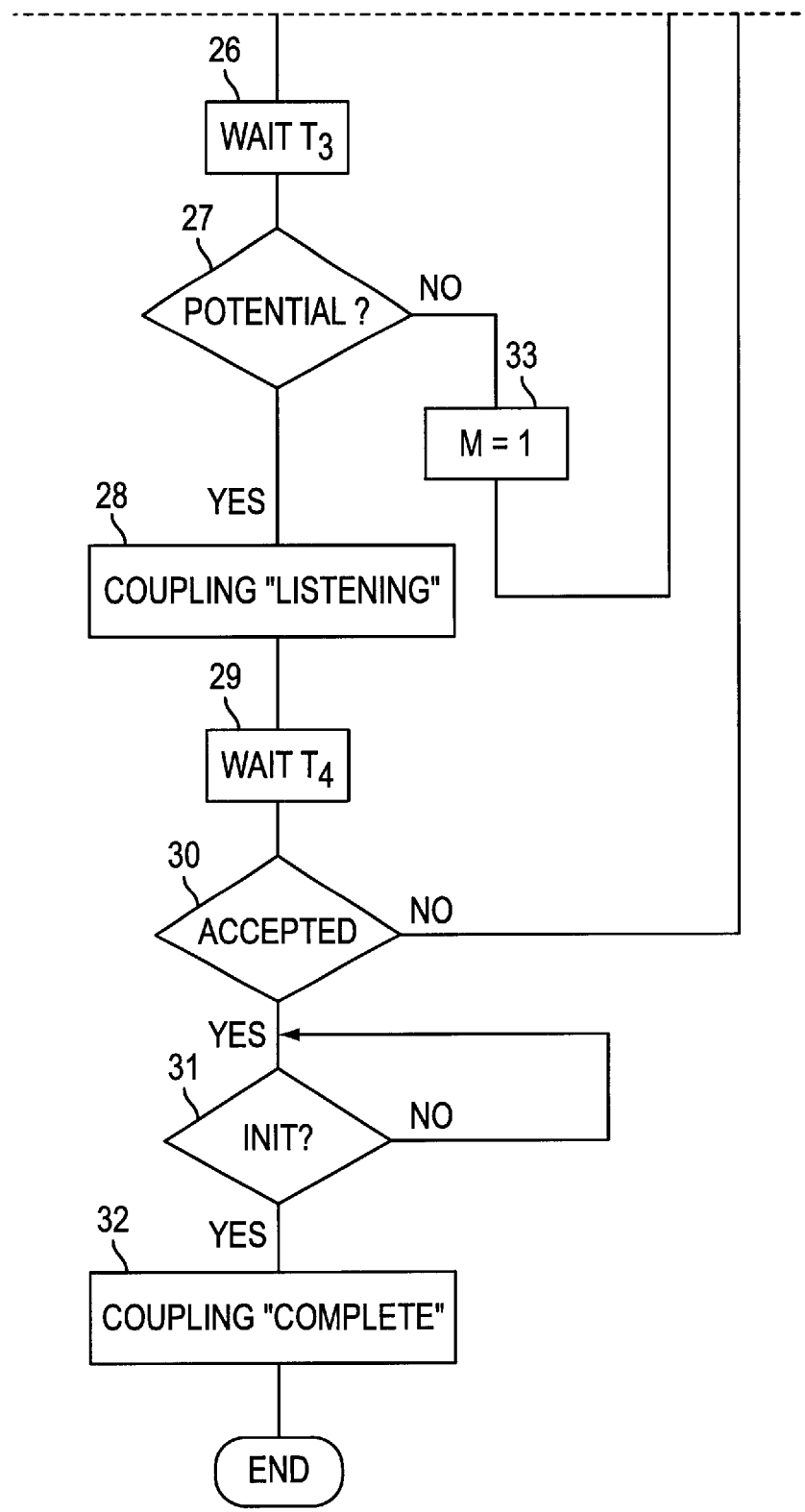
FIG. 3B shows a second portion of the sequence for coupling the assembly to the bus.

Individual blocks have been illustrated in a simplified manner in FIGS. 3A and 3B for the sake of improved clarity. Thus, for example, the block groups 23/24, 26/27 and 29/30 are in reality loops during which an interrogation is continually made to see whether the respective termination criterion is present. In addition, of course, a check is continually made to see whether the assembly 2, 3 is still inserted and whether the power supply is functioning properly. As soon as one of these two conditions is no longer met, the sequence immediately branches—optionally after setting the marker M to the value 1—to one of the blocks 18 or 19.

As show in FIG. 2, all of the bus lines 4-2 to 4-5 are, furthermore, connected directly to the evaluation circuit 13. Since the evaluation circuit 13 knows whether or not the bus traffic takes place via the assembly 2, 3 assigned to it, this can operate the shift register 13' and the switch 13" correspondingly when the assembly 2, 3 is not coupled to the control bus 4. In other words: before the first identification run after the monitoring coupling of the assembly 2, 3, the evaluation circuit 13 monitors the bus traffic and in the event of an instruction transmission bridges the data line 4-1 by means of the switch 13" and couples the shift register 13' to the data line 4-1, and in the event of a data transmission bridges the data line 4-1 by means of the switch 13" or loops the shift register 13' onto the data line 4-1, depending on the instruction transmitted last.

What is claimed is:

1. A method for connecting an assembly of a programmable logic controller to a bus, the assembly being connectable to the bus via first and second supply lines and a signal line, the method comprising the steps of:

controlling, with an evaluation circuit, a variable resistor to have a high resistance when the assembly is not connected to the bus, the variable resistor being arranged in at least one of the first and second supply lines;

controlling, with the evaluation circuit, the variable resistor to have a low resistance when the assembly is connected to the bus only after a predetermined connection time has elapsed; and after the variable resistor has been controlled to have the low resistance, further controlling the variable resistor to have the high resistance, after a predetermined run-up time has elapsed, if a potential at a test input of the evaluation circuit is outside a predetermined value range.

2. The method according to claim 1, further comprising the step of:

controlling the variable resistor to change from the high resistance to the low resistance during a predetermined starting time.

3. The method according to claim 1, wherein the assembly is connected to the bus via the signal line only when the potential present at the test input of the evaluation circuit is within the predetermined value range and after the predetermined run-up time has elapsed.

4. A bus access circuit for connecting an assembly of a programmable logic controller to a bus, comprising:

a first supply line;

a second supply line;

a signal line, the first supply line, the second supply line and the signal line connecting the assembly to the bus;

a variable resistor arranged in at least one of the first and second supply lines, the variable resistor having a control input; and an evaluation circuit connected to a control input of the variable resistor and having a test input for acquiring a potential at the assembly, the evaluation circuit:

controlling the variable resistor to have a high resistance when the assembly is not connected the bus, controlling the variable resistor to have a low resistance when the assembly is connected to the bus and only after a predetermined connection time has elapsed, and after the variable resistor has been controlled to have a low resistance, further controlling the variable resistor to have the high resistance if, after a predetermined run-up time has elapsed, the potential at the test input is outside a predetermined value range.

5. The bus access circuit according to claim 4, wherein the evaluation circuit connects the assembly to the bus via the signal line when the potential at the test input is within the predetermined value range and only after the predetermined run-up time has elapsed.

6. A method for connecting an assembly of a programmable logic controller to a bus, the assembly being connectable to the bus via first and second supply lines and a signal line, the method comprising the steps of:

controlling, with an evaluation circuit, a variable resistor to have a high resistance when the assembly is not connected to the bus, the variable resistor being arranged in at least one of the first and second supply lines;

controlling, with the evaluation circuit, the variable resistor to have a low resistance when the assembly is connected to the bus only after a predetermined connection time has elapsed; and after the variable resistor has been controlled to have the low resistance, further controlling the variable resistor to have the high resistance, after a predetermined run-up time has elapsed, if a potential at a test input of the evaluation circuit is outside a predetermined value range, wherein the assembly is connected to the bus via the signal line only when the potential present at the test input of the evaluation circuit is within the predetermined value range and after the predetermined run-up time has elapsed, and after the assembly is connected to the bus, the assembly receives signals via the signal line and does not transmit signals via the signal line.

7. The method according to claim 6, further comprising the steps of:

evaluating, using the assembly, the signals transmitted via the signal line;

communicating, using the assembly, an acceptance signal to the evaluation circuit if the assembly is capable of evaluating the signals transmitted via the signal line; and controlling, by the evaluation circuit, the variable resistor to have the high resistance if the evaluation circuit has not received the acceptance signal after a predetermined acceptance waiting time has elapsed.

8. The method according to claim 7, further comprising the steps of:

periodically determining which assemblies are connected to the bus; and during a first determination of which assemblies are connected to the bus and if the evaluation circuit received the acceptance signal before the predetermined acceptance waiting time has elapsed, coupling the assembly to the bus in a writing manner using the evaluation circuit, the first determination being performed after the predetermined acceptance waiting time has elapsed.

9. The method according to claim 6, further comprising the steps of:

assigning the evaluation circuit to the bus;

looping the signal line through the assembly during a portion of signal transmissions;

assigning a shift register to the evaluation circuit; and looping, using the evaluation circuit, the shift register into the signal line during the signal transmissions when the assembly is not connected to the bus.

10. A bus access circuit for connecting an assembly of a programmable logic controller to a bus, comprising:

a first supply line;

a second supply line;

a signal line, the first supply line, the second supply line and the signal line connecting the assembly to the bus;

a variable resistor arranged in at least one of the first and second supply lines, the variable resistor having a control input; and an evaluation circuit connected to a control input of the variable resistor and having a test input for acquiring a potential at the assembly, the evaluation circuit:

controlling the variable resistor to have a high resistance when the assembly is not connected the bus, controlling the variable resistor to have a low resistance when the assembly is connected to the bus and only after a predetermined connection time has elapsed, and after the variable resistor has been controlled to have a low resistance, further controlling the variable resistor to have the high resistance if, after a predetermined run-up time has elapsed, the potential at the test input is outside a predetermined value range, wherein, after the assembly is connected to the bus, the assembly receives and evaluates signals transmitted via the signal line without transmitting signals via the signal line, and communicates an acceptance signal to the evaluation circuit if the assembly is capable of evaluating the signals transmitted via the signal line, and wherein the evaluation circuit controls the variable resistor to have the high resistance if the evaluation circuit has not receive the acceptance signal after an predetermined acceptance waiting time has elapsed.

11. The bus access circuit according the claim 10, wherein the bus periodically determines which assemblies are connected to the bus, and wherein, during a first determination of which assemblies are connected to the bus, the evaluation circuit couples the assembly to the bus in a writing manner if the evaluation circuit receives the acceptance signal before the predetermined acceptance waiting time has elapsed, the first determination being performed after the predetermined acceptance waiting time has elapsed.

12. The bus access circuit according to claim 10, further comprising:

at least one switch assigned to the evaluation circuit; and a shift register assigned to the evaluation circuit, wherein the evaluation circuit is assigned to the bus, wherein the signal line is looped through the assembly during a portion of signal transmissions, and wherein, using the at least one switch and when an assembly is not connected to the bus, the shift register is looped into the signal line during the signal transmissions.

* * * * *